United States Patent
Lucco et al.

(10) Patent No.: US 10,628,398 B2
(45) Date of Patent: *Apr. 21, 2020

(54) CONSERVATIVE GARBAGE COLLECTING AND TAGGED INTEGERS FOR MEMORY MANAGEMENT

(71) Applicant: MICROSOFT TECHNOLOGY LICENSING, LLC., Redmond, WA (US)

(72) Inventors: Steven Lucco, Bellevue, WA (US); Curtis Cheng-Cheng Man, Seattle, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/597,096

(22) Filed: May 16, 2017

(65) Prior Publication Data

US 2017/0322955 A1 Nov. 9, 2017

Related U.S. Application Data

(63) Continuation of application No. 14/485,800, filed on Sep. 15, 2014, now Pat. No. 9,684,679, and a
(Continued)

(51) Int. Cl.
*G06F 17/30* (2006.01)
*G06F 16/215* (2019.01)
*G06F 12/02* (2006.01)

(52) U.S. Cl.
CPC ........ *G06F 16/215* (2019.01); *G06F 12/0253* (2013.01); *G06F 2212/702* (2013.01)

(58) Field of Classification Search
CPC .......... G06F 17/30303; G06F 12/0253; G06F 16/215
See application file for complete search history.

(56) References Cited

U.S. PATENT DOCUMENTS

| 5,920,876 A | 7/1999 | Ungar et al. |
| 5,991,779 A | 11/1999 | Bejar |

(Continued)

FOREIGN PATENT DOCUMENTS

| CN | 102622599 A | 8/2012 |
| EP | 874309 A2 | 10/1998 |

(Continued)

OTHER PUBLICATIONS

"Garbage Collection 15-745 Optimizing Compilers", Retrieved From: <<http://www.cs.cmu.edu/afs/cs/academic/class/15745-s06/web/handouts/garbage.pdf>>, Mar. 2, 2011, pp. 1-14.
(Continued)

*Primary Examiner* — Huawen A Peng

(57) ABSTRACT

Aspects for conservative garbage collecting are disclosed. In one aspect, root objects included in a call stack are identified, which comprise integers and pointers. Integer representations are tagged and distinguishable from untagged pointer representations. Root objects are traced to corresponding memory locations such that a subsequent tracing is performed on the pointer representations and skipped on the integer representations. Memory allocated to objects unreachable by the call stack is then freed. In another aspect, an object graph associated with a call stack is tagged, and a heap is generated comprising objects included in an executed portion of the call stack. Objects included in an unexecuted portion of the call stack are traced to corresponding memory locations on the heap such that a subsequent tracing is only performed on the untagged pointer
(Continued)

representations. Memory locations corresponding to heap objects unreachable by the unexecuted portion of the call stack are then cleared.

18 Claims, 10 Drawing Sheets

Related U.S. Application Data continuation of application No. 13/093,724, filed on Apr. 25, 2011, now Pat. No. 8,862,640.

(56) References Cited

U.S. PATENT DOCUMENTS

| | | | |
|---|---|---|---|
| 6,101,580 | A | 8/2000 | Agesen et al. |
| 6,598,141 | B1* | 7/2003 | Dussud .............. G06F 12/0253 |
| | | | 707/999.102 |
| 6,675,354 | B1 | 1/2004 | Claussen et al. |
| 6,782,192 | B1 | 8/2004 | Tanaka et al. |
| 7,062,709 | B2 | 6/2006 | Cheung |
| 7,325,106 | B1 | 1/2008 | Dmitriev et al. |
| 7,631,024 | B2 | 12/2009 | Wright et al. |
| 7,730,016 | B2 | 6/2010 | Lee et al. |
| 8,335,806 | B2* | 12/2012 | Schatzl .................. G06F 16/00 |
| | | | 707/813 |
| 8,423,589 | B2* | 4/2013 | Burka ................. G06F 12/0253 |
| | | | 707/816 |
| 8,862,640 | B2 | 10/2014 | Lucca et al. |
| 2004/0123236 | A1 | 6/2004 | Cheung |
| 2005/0283585 | A1 | 12/2005 | Sexton et al. |
| 2006/0173897 | A1 | 8/2006 | Lee et al. |
| 2007/0067372 | A1 | 3/2007 | Meijer |
| 2007/0150868 | A1 | 6/2007 | Wu et al. |
| 2007/0162527 | A1 | 7/2007 | Wright et al. |
| 2008/0098296 | A1 | 4/2008 | Brichford et al. |
| 2009/0327372 | A1* | 12/2009 | Ylonen ............... G06F 12/0253 |
| 2009/0327377 | A1 | 12/2009 | Ylonen |
| 2010/0023884 | A1 | 1/2010 | Brichford et al. |
| 2010/0122157 | A1 | 5/2010 | Cepero Gonzalez |

FOREIGN PATENT DOCUMENTS

| | | |
|---|---|---|
| JP | H0442338 A | 2/1992 |
| JP | H10301835 A | 11/1998 |
| JP | 2010073127 A | 4/2010 |

OTHER PUBLICATIONS

"SpiderMonkey_Memory.txt", Retrieved From: <<http://www.cs.cmu.edu/afs/cs/academic/class/15745-s06/web/handouts/garbage.pdf>>, Mar. 2, 2011, pp. 1-14.
"Stack vs Heap Allocation", Retrieved From: <<http://www-ee.eng.hawaii.edu/~tep/EE160/Book/chap14/subsection2.1.1.8.html>>, Sep. 3, 1994, 2 Pages.
"What and Where are the Stack and Heap?", Retrieved From:<<https://stackoverflow.com/questions/79923/what-and-where-are-the-stack-and-heap>>, Sep. 17, 2008, 24 Pages.
"Office Action Issued in Japanese Patent Application No. 2014-508373", dated Aug. 7, 2017, 5 Pages.
Venners, Bill, "Java's Garbage-Collected Heap", In Java World, Aug. 1, 1996, 3 Pages.
"Notice of Allowance Issued in European Patent Application No. 12776762.2", dated May 31, 2016, 07 Pages.
"Search Report Issued in European Patent Application No. 12776762.2", dated Jan. 5, 2015, 6 Pages.
"Final Office Action Issued in U.S. Appl. No. 13/093,724", dated May 30, 2013, 18 Pages.
"Non Final Office Action Issued in U.S. Appl. No. 13/093,724", dated Mar. 11, 2014, 19 Pages.
"Non Final Office Action Issued in U.S. Appl. No. 13/093,724", dated Feb. 12, 2013, 17 Pages.
"Notice of Allowance Issued in U.S. Appl. No. 13/093,724", dated Jun. 17, 2014, 8 Pages.
"Final Office Action Issued in U.S. Appl. No. 14/485,800", dated Aug. 4, 2015, 19 Pages.
"Final Office Action Issued in U.S. Appl. No. 14/485,800", dated Apr. 28, 2016, 16 Pages.
"Non Final Office Action Issued in U.S. Appl. No. 14/485,800", dated Dec. 3, 2015, 16 Pages.
"Non Final Office Action Issued in U.S. Appl. No. 14/485,800", dated Feb. 13, 2015, 9 Pages.
"Notice of Allowance Issued in U.S. Appl. No. 14/485,800", dated Apr. 7, 2017, 2 Pages.
"Notice of Allowance Issued in U.S. Appl. No. 14/485,800", dated Feb. 15, 2017, 8 Pages.
"Notice of Allowance Issued in U.S. Appl. No. 14/485,800", dated May 2, 2017, 2 Pages.
"First Office Action and Search Report Issued in China Patent Application No. 201280020077.4", dated Jun. 30, 2015, 15 Pages.
"Notice of Allowance Issued in China Patent Application No. 201280020077.4", dated Jun. 14, 2016, 4 Pages.
"Second Office Action Issued in China Patent Application No. 201280020077.4", dated Jan. 13, 2016, 7 Pages.
"Office Action Issued in Japan Patent Application No. 2014-508373", dated May 31, 2016, 8 Pages.
"Office Action Issued in Japan Patent Application No. 2014-508373", dated Jan. 25, 2017, 11 Pages.
Ager, Mads Sig., "Google I/0 2009-V8, High Performance JavaScript Engine", Retrieved From <<https://web.archive.org/web/20090619141640/http://www.youtube.com/watch?v=FrufJFBSoQY&feature=related>>, Retrieved on Jun. 2, 2009, 110 Pages.
Ager, Mads Sig., "Google I/0 2009-V8, High Performance JavaScript Engine", Retrieved From <<https://web.archive.org/web/20090619141640/http://www.youtube.com/watch?v=FrufJFBSoQY&feature=related>>, Retrieved on : Jun. 2, 2009, 227 Pages.
Ager, Mads Sig., "Google I/0 2009-V8, High Performance JavaScript Engine", Retrieved From <<https://web.archive.org/web/20090619141640/http://www.youtube.com/watch?v=FrufJFBSoQY&feature=related>>, Retrieved on : Jun. 2, 2009, 122 Pages.
"International Search Report and Written Opinion Issued in PCT Application No. PCT/US2012/32639", dated Dec. 26, 2012, 8 Pages.
Boehm, et al., "Garbage Collection in An Uncooperative Environment", In Journal-Software Practice & Experience, vol. 18, Issue 9, Sep. 1988, 14 Pages.
Chen, et al., "Residue Objects: A Challenge to Web Browser Security", In Proceedings of the 5th European Conference on Computer Systems, Apr. 16, 2010, 13 Pages.
Non-Final Office Action Issued in U.S. Appl. No. 14/485,800, dated Sep. 21, 2016, 11 Pages.
Marlow, et al., "Making a Fast Curry: Push/Enter vs. Eval/Apply for Higher-order Languages", Proceedings of the Ninth ACM SIGPLAN International Conference on Functional Programming, Sep. 2004, 15 Pages.
Nakamura, et al., "Garbage Collection—Algorithms and Implementation", Published by Shuwa System Co. Ltd., Mar. 25, 2010, pp. 14-19 and pp. 123-129.
"Notice of Allowance Issued in Korean Patent Application No. 10-2013-7028115", dated Sep. 28, 2018, 2 Pages.
"Office Action Issued in Korean Patent Application No. 10-2013-7028115", dated Jul. 20, 2018, 6 Pages.
"Office Action Issued in Korean Patent Application No. 10-2018-7026942", dated Dec. 18, 2018, 5 Pages.
"First Office Action Issued in Chinese Patent Application No. 201610697224.1", dated Dec. 29, 2018, 6 Pages.
"Office Action Issued in Korean Patent Application No. 10-2019-7004511", dated Mar. 21, 2019, 5 Pages.
"Office Action Issued in Japanese Patent Application No. 2017-234927", dated Mar. 6, 2019. 8 Pages.

(56) References Cited

OTHER PUBLICATIONS

"Office Action Issued in Korean Patent Application No. 10-2019-7014525", dated Jul. 31, 2019, 9 Pages.

* cited by examiner

API: Application Programming Interface

CONSERVATIVE GARBAGE COLLECTING AND TAGGED INTEGERS FOR MEMORY MANAGEMENT

CROSS REFERENCE TO RELATED APPLICATIONS

This is a continuation of application Ser. No. 14/485,800 filed on Sep. 15, 2014, entitled "CONSERVATIVE GARBAGE COLLECTING AND TAGGED INTEGERS FOR MEMORY MANAGEMENT" which is a continuation of application Ser. No. 13/093,724 filed on Apr. 25, 2011, entitled "CONSERVATIVE GARBAGE COLLECTING AND TAGGED INTEGERS FOR MEMORY MANAGEMENT", both of which are incorporated by reference.

TECHNICAL FIELD

The subject disclosure relates to tagged integers in connection with conservative garbage collecting for memory management.

BACKGROUND

By way of background concerning some conventional systems, it is noted that computing devices have traditionally stored information and associated applications. To these ends, implementing an efficient memory management scheme is desirable for achieving increased computing performance. Developments in automatic memory management schemes have been particularly desirable over manual memory management schemes. Garbage collector algorithms, for instance, are automatic memory management schemes which attempt to reclaim memory occupied by objects that are no longer in use by a particular program.

Tracing garbage collectors are the most common type of garbage collector. Tracing garbage collectors first determine which objects are reachable (or potentially reachable), and then discard all remaining objects. A reachable object can be defined as an object for which there exists some variable in the program environment that led to the variable, either directly or through reference from other reachable objects. More precisely, objects are generally reachable in two ways. First, a distinguished set of objects, known as roots, are assumed to be reachable. Typically, these include the objects referenced from anywhere in the call stack (that is, all local variables and parameters in the functions currently being invoked), and any global variables. Second, anything referenced from a reachable object is itself deemed reachable.

A complication with conventional garbage collectors, in languages with both reference types and unboxed value types, is that the garbage collectors distinguish which variables on a call stack are regular values (e.g., integers) and which are references (e.g., pointers). Such distinction would be useful in such systems for distinction purposes since an integer and a reference might otherwise look alike as represented in memory. In this regard, the garbage collector would be able to use the distinction to decide whether to treat a particular element as a reference and follow the reference, or whether it is simply a primitive value.

The above-described deficiencies of today's memory management schemes are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments in a simplified form as a prelude to the more detailed description of the various embodiments that follow.

In accordance with one or more embodiments and corresponding disclosure, various non-limiting aspects are described in connection with conservative garbage collecting for memory management. In one such aspect, a method for tagging integers within a conservative garbage collecting algorithm is provided. The method can include identifying root objects included in a call stack, which can comprise integer representations and pointer representations. The embodiment can further include tagging the integer representations such that a tagged integer representation is distinguishable from an untagged pointer representation. The method can also include tracing the root objects to a corresponding set of memory locations. For this particular embodiment, a subsequent tracing is performed on the untagged pointer representation, whereas the subsequent tracing is skipped on the tagged integer representation. The method can then further include freeing memory allocated to a set of objects unreachable by the call stack.

In another aspect, a memory management device configured to implement a conservative garbage collecting algorithm with tagged integers is disclosed. Within such embodiment, the memory management device includes a processor configured to execute computer executable components stored in memory. The computer executable components include a scanning component, a tagging component, a tracing component, and a recycling component. The scanning component is configured to identify root objects included in a call stack, which can comprise integer representations and pointer representations. The tagging component is then configured to tag the integer representations such that tagged integer representations are distinguishable from untagged pointer representations, whereas the tracing component is configured to trace the root objects to a corresponding set of memory locations. For this embodiment, the tracing component is configured to perform a subsequent tracing on the untagged pointer representations, wherein the subsequent tracing is skipped on the tagged integer representations. The recycling component is then configured to free memory allocated to a set of objects unreachable by the call stack.

In yet another aspect, a computer-readable storage medium is disclosed for tagging integers within a conservative garbage collecting algorithm. Within such embodiment, the computer-readable storage medium includes computer-readable instructions for causing at least one processor to perform various acts. For instance, such acts include tagging an object graph associated with a call stack, and generating a heap of objects during an execution of the call stack. Here, root objects included in a tagged object graph comprise tagged integer representations and untagged pointer representations, whereas the heap of objects comprises objects included in an executed portion of the call stack. This embodiment further includes tracing unexecuted objects included in an unexecuted portion of the call stack to corresponding memory locations on the heap. For this particular embodiment, a subsequent tracing is performed on the untagged pointer representations and skipped on the tagged integer representations. Memory locations corresponding to unreachable objects on the heap are then cleared, wherein the unreachable objects are unreachable by the unexecuted portion of the call stack.

Other embodiments and various non-limiting examples, scenarios and implementations are described in more detail below.

BRIEF DESCRIPTION OF THE DRAWINGS

Various non-limiting embodiments are further described with reference to the accompanying drawings in which.

DETAILED DESCRIPTION

Overview

Figure 1:
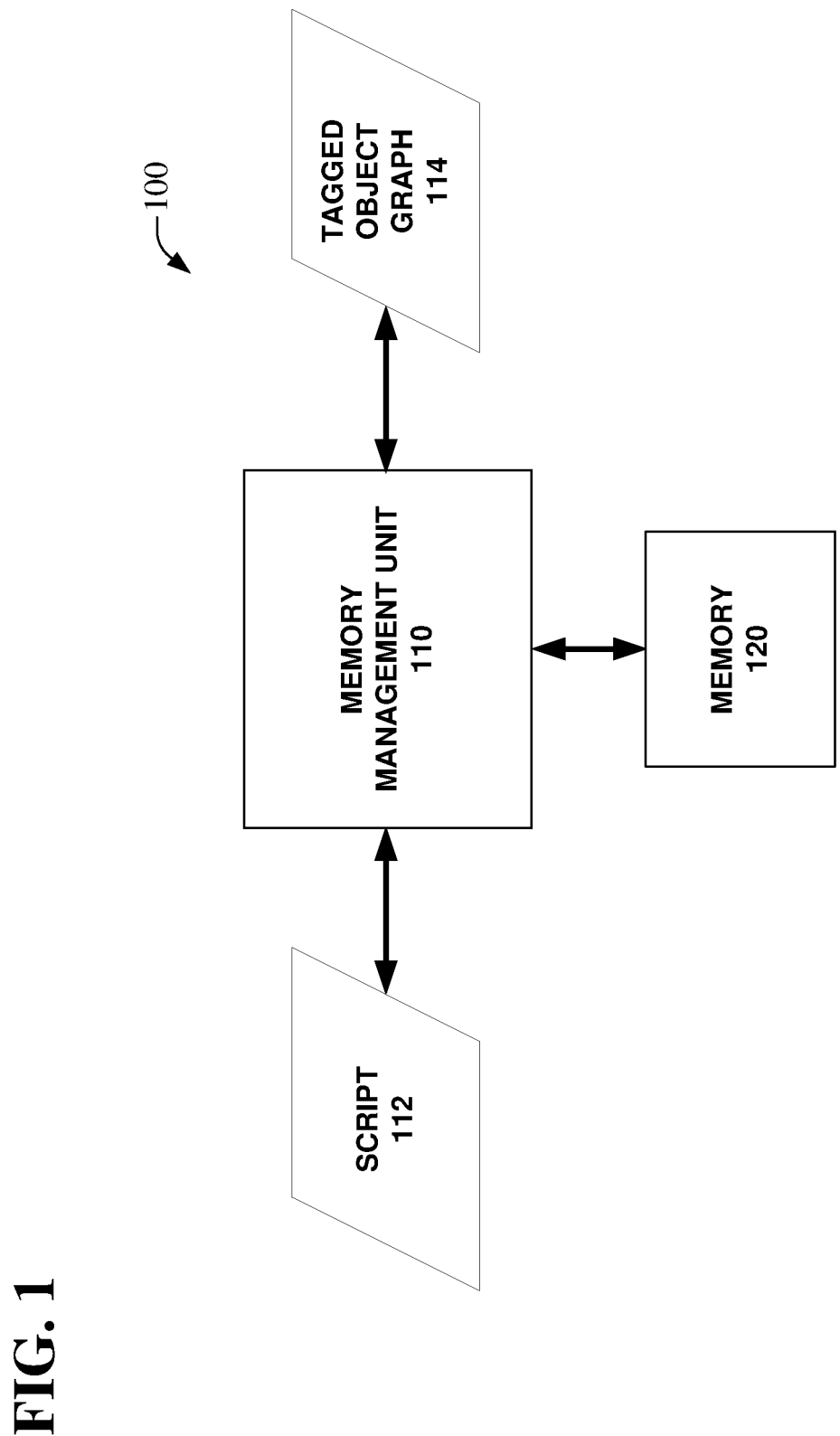
FIG. 1 illustrates an exemplary system that facilitates implementing a conservative garbage collecting algorithm according to an embodiment.

As discussed in the background, it is desirable to implement a garbage collector algorithm which distinguishes between integers and pointers on a call stack. In various embodiments, memory management is redesigned around native code compatibility. In an aspect, script objects are less managed objects, and more just native pieces of memory such that reference counting among objects is eliminated. Moreover, a conservative garbage collection algorithm is implemented, where it is not assumed everything that is a pointer is known. With a common language runtime (CLR) garbage collector for instance, the stack is strongly typed. However, with native code, e.g., C code, and script code, one does not know what is on the stack. In this regard, instead of utilizing a reference counting model, it is contemplated that objects are interacted with directly.

The various embodiments disclosed herein are directed towards tagging integers within a conservative garbage collecting algorithm. To this end, it is noted that the aspects disclosed herein facilitate an execution of scripts (e.g., javascripts) against a document object model which is less likely to generate spurious pointers. Moreover, the aspects disclosed herein reduce the probability of spurious pointers since untagged pointers and tagged integers are readily distinguishable.

Tagged Integers and Conservative Garbage Collection

Several issues have arisen as the web browsing experience evolves from a flat presentation of information with minimal interactivity to a richer application or applet experience with lots of interactivity at the client side. More generally, the web browsing experience has evolved into a hybrid of information display and richer interactivity with objects on display. Particular challenges with this evolution are based on adapting the old document object model (DOM), which was originally designed primarily for flat presentation of information based on native code on a client, to an experience that fluidly handles script code, such as javascript objects.

Improving speed is particularly important so as to facilitate a more desirable user experience. For instance, with fly out menus of the past, the web experience flickered with delays based on communications with the server. Scripts, however, enable small programs to modify the DOM on the fly without going back to the server. As people want to do more on the fly without returning to the server, making script code execute fast has become a challenge.

Since the user experience is largely influenced by effectively scripting the DOM, it is desirable to change the DOM as fast as possible to maximize the interactive response. Communication between the scripting engines and the native classes of the DOM were poor in the past due to the use of object linking & embedding (OLE) automation including a set of interfaces, e.g., iDispatch, iActiveScript, etc., which make any object scriptable. However, such methods are slow, and thus improvements are desired. Accordingly, the aspects disclosed herein are directed towards improving script execution speed by tagging integers within a conservative garbage collecting algorithm.

FIG. 1 illustrates an exemplary system that facilitates implementing a conservative garbage collecting algorithm according to an embodiment. As illustrated, system 100 can include memory management unit 110, which is communicatively coupled to memory 120. In an aspect, memory management unit 110 is configured to implement a conservative garbage collecting algorithm to manage memory space in memory 120. Moreover, memory management unit 110 is configured to generate a tagged object graph 114 associated with an execution of script 112. For instance, script 112 may be a javascript executed against a DOM, wherein the javascript includes various objects requiring an allocation of memory space in memory 120. In a particular embodiment, to facilitate distinguishing between integers and pointers within memory 120, script objects corresponding to integer values are tagged by memory management unit 110 and included in tagged object graph 114.

Figure 2:
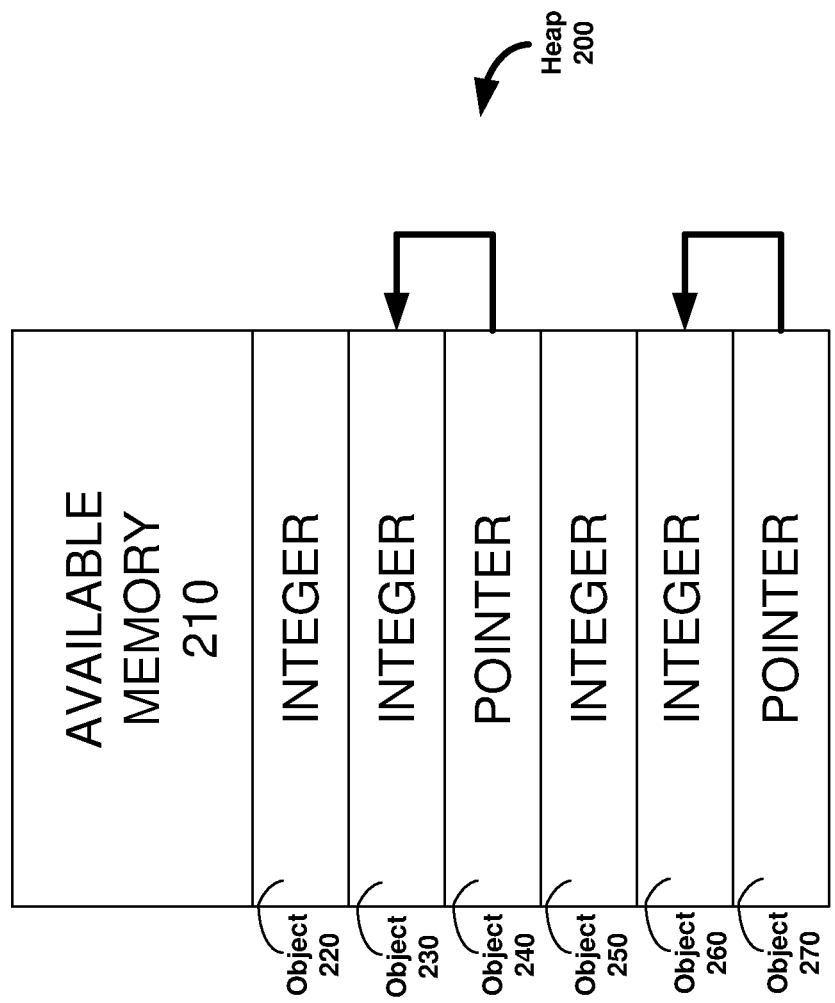
FIG. 2 is a diagram illustrating an exemplary heap of objects according to an embodiment.

In an aspect, memory allocated to script objects comprises storing such objects onto a heap. Referring next to FIG. 2, a block diagram of an exemplary heap of objects according to an embodiment is provided. As shown, heap 200 can include available memory 210, along with allocated memory corresponding to various objects 220, 230, 240, 250, 260, and 270. For this particular example, objects 240 and 270 correspond to pointer values, whereas, objects 220, 230, 250, and 260 correspond to integer values. Namely, object 240 is a pointer value which references the integer value represented by object 230, whereas object 270 is a pointer value which references the integer value represented by object 260.

Figure 3:
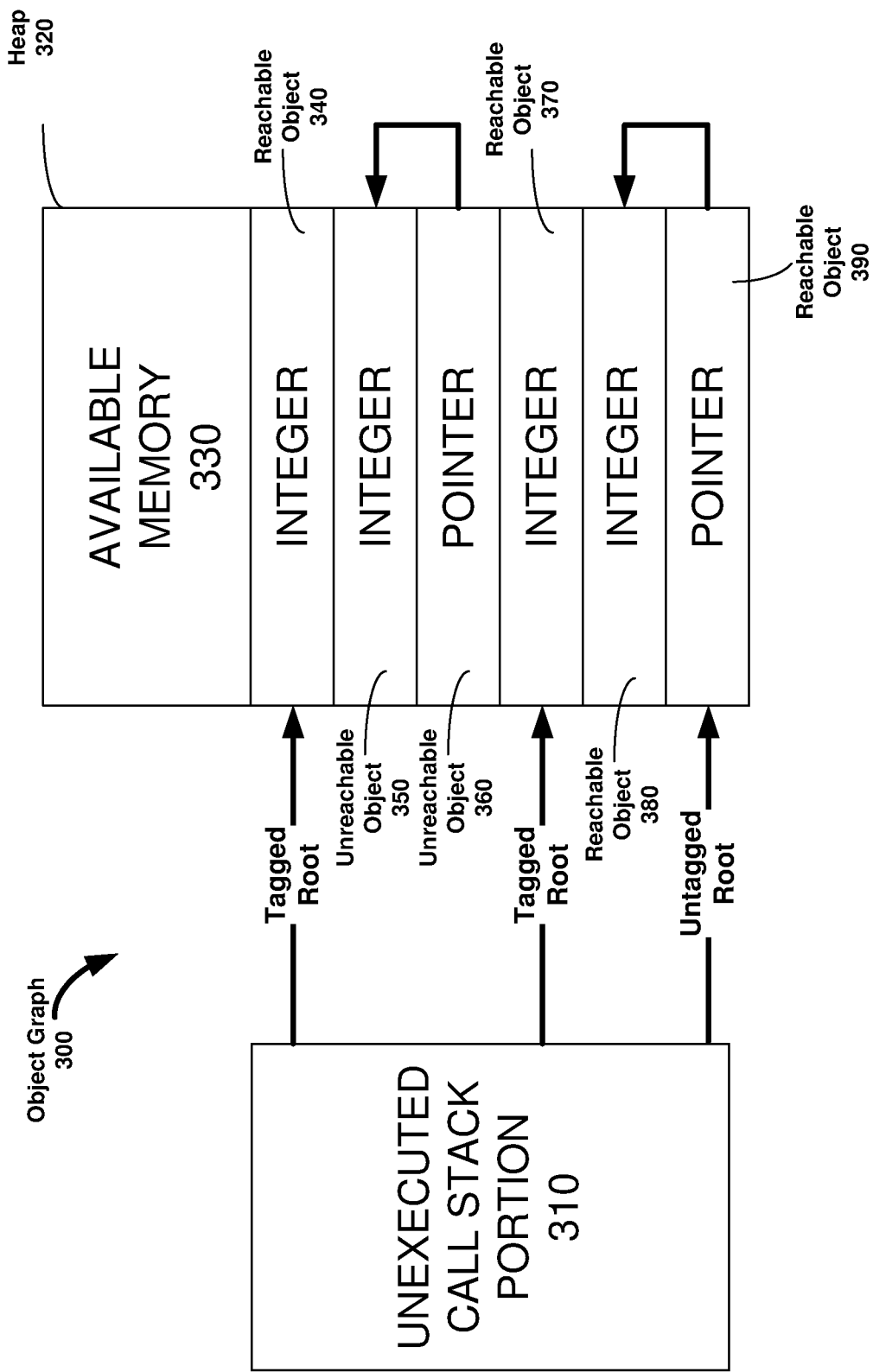
FIG. 3 is a diagram illustrating an exemplary object graph according to an embodiment.

In this regard, script objects corresponding to integer values can be tagged so that they are readily distinguishable from pointer values. Referring next to FIG. 3, a diagram illustrating an exemplary object graph is provided which facilitates a mapping of tagged/untagged objects on the heap. As illustrated, object graph 300 maps objects included in an unexecuted call stack portion 310 to heap 320. To these and related ends, it noted that heap 320 and available memory 330 are generally analogous to heap 200 available memory 210, respectively.

In an aspect, object graph 300 is utilized to determine which objects on heap 320 are reachable by unexecuted call stack portion 310. Namely, root objects included in unexecuted call stack portion 310 are traced to corresponding memory locations in heap 320, wherein root objects corresponding to integer values are tagged. It is then contemplated that a subsequent tracing of root objects is only performed on reachable untagged pointer values to identify reachable objects referenced by those pointer values. Conversely, a subsequent tracing is skipped on reachable tagged integer values. For this particular example, since reachable object 390 is a root object corresponding to a pointer value, it is untagged. Therefore, a subsequent tracing is performed on reachable object 390, which identifies reachable object 380 corresponding to an integer value. A subsequent tracing, however, is skipped on reachable objects 340 and 370 since these are root objects corresponding to tagged integer values.

It is noted that object graph 300 can be utilized to identify objects unreachable by unexecuted call stack portion 310. In this particular example, unreachable objects 350 and 360 are deemed unreachable since they do not correspond to root objects in unexecuted call stack portion 310, nor are they referenced by a reachable pointer object.

Figure 4:
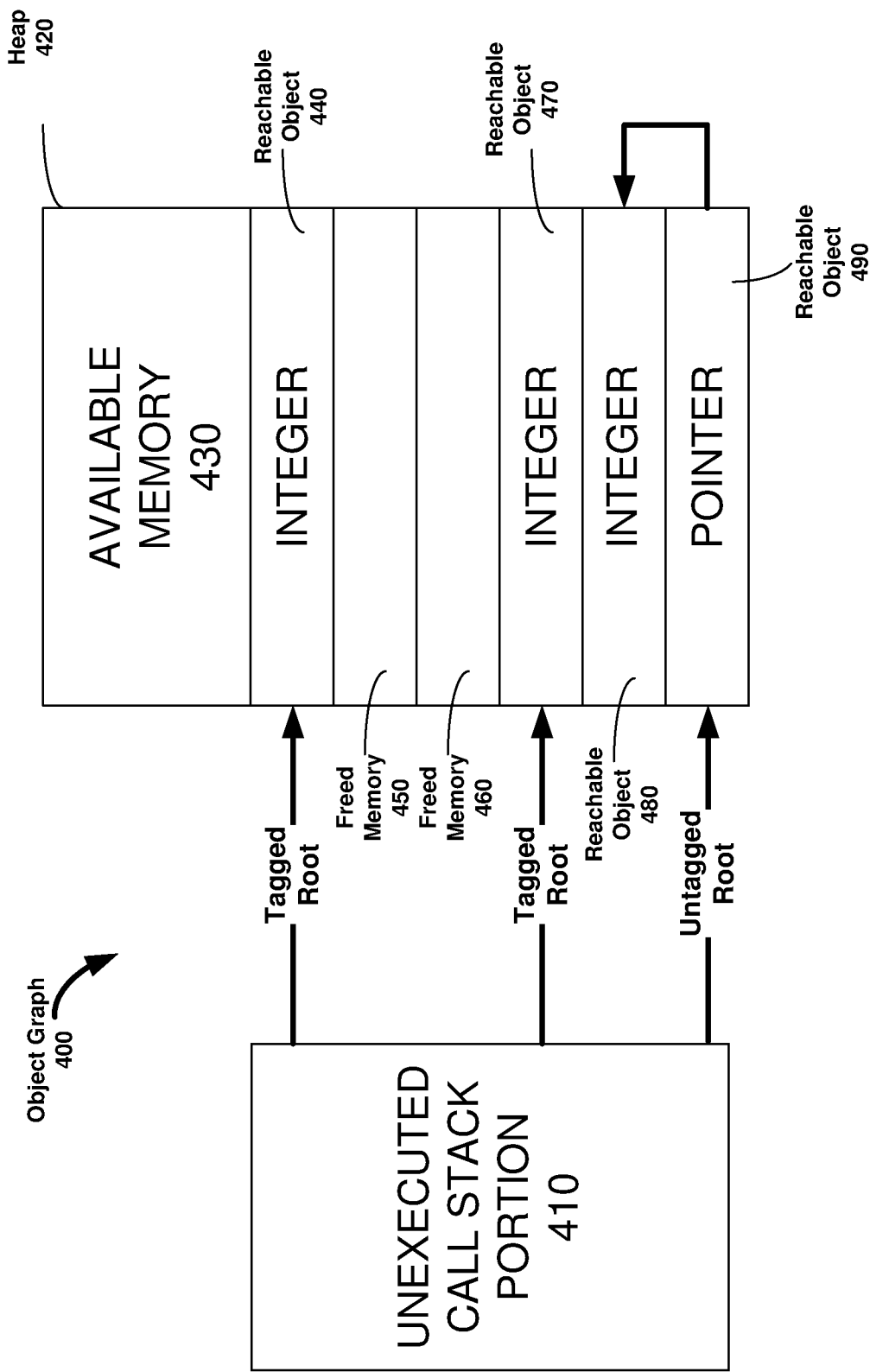
FIG. 4 is a diagram illustrating an exemplary freeing of memory according to an embodiment.

Upon identifying unreachable objects, memory allocated to such objects can be cleared. Referring next to FIG. 4 a diagram illustrating an exemplary freeing of memory according to an embodiment is provided. As illustrated, object graph 400 includes heap 420, which is generally analogous to heap 200 and 320, wherein heap 420 depicts a freeing of memory previously allocated to unreachable objects 350 and 360. Namely, heap 420 now includes freed memory 450 and 460, in addition to available memory 430. In an aspect, however, reachable objects 440, 470, 480, and 490 are preserved in their original storage locations (i.e., heap 420 is not collapsed).

Figure 5:
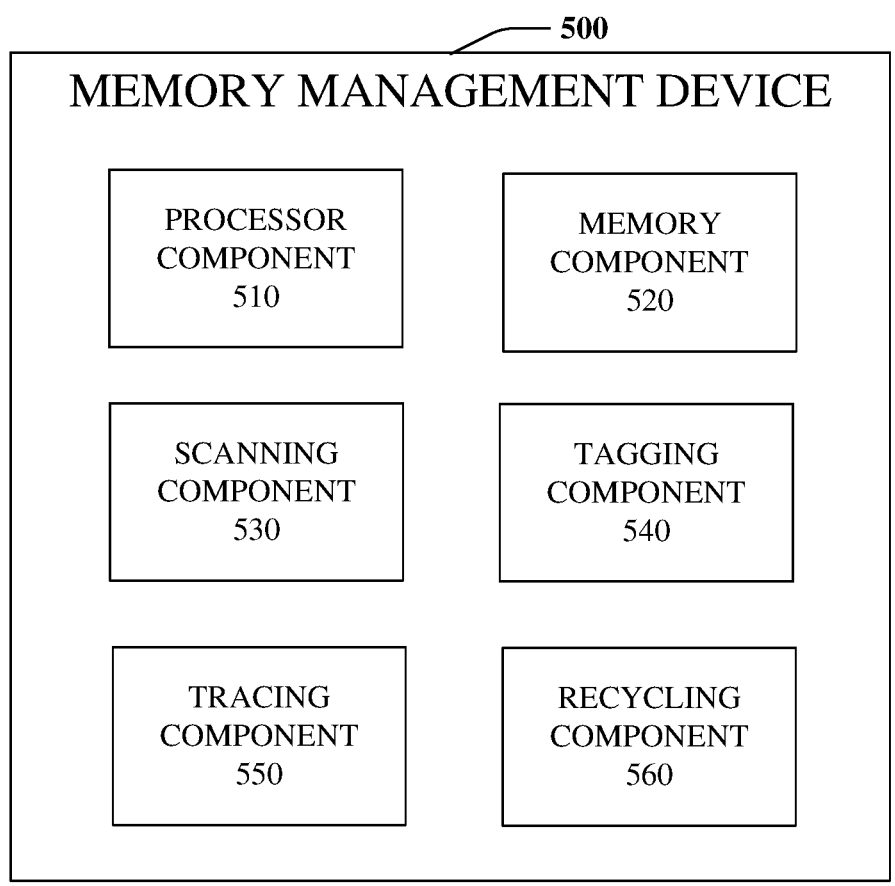
FIG. 5 is a block diagram illustrating an exemplary memory management device according to an embodiment.

Referring next to FIG. 5, a block diagram illustrates an exemplary memory management unit configured to implement a conservative garbage collecting algorithm in accordance with various aspects. As illustrated, memory management unit 500 can include processor component 510, memory component 520, scanning component 530, tagging component 540, tracing component 550, and recycling component 560.

In one aspect, processor component 510 is configured to execute computer-readable instructions related to performing any of a plurality of functions. Processor component 510 can be a single processor or a plurality of processors dedicated to analyzing information to be communicated from memory management unit 500 and/or generating information that can be utilized memory component 520, scanning component 530, tagging component 540, tracing component 550, and/or recycling component 560. Additionally or alternatively, processor component 510 can be configured to control one or more components of memory management unit 500.

In another aspect, memory component 520 is coupled to processor component 510 and configured to store computer-readable instructions executed by processor component 510. Memory component 520 can also be configured to store any of a plurality of other types of data including data generated by any of scanning component 530, tagging component 540, tracing component 550, and/or recycling component 560. Memory component 520 can be configured in a number of different configurations, including as random access memory, battery-backed memory, hard disk, magnetic tape, etc. Various features can also be implemented upon memory component 520, such as compression and automatic back up, e.g., use of a Redundant Array of Independent Drives configuration.

As illustrated, memory management unit 500 can also include scanning component 530. Within such embodiment, scanning component 530 is configured to identify root objects included in a call stack, which comprise integer representations and pointer representations. Here, it is contemplated that such a call stack is associated with a script executed against a particular object model. For instance, the call stack can be associated with a compilation of a javascript, which facilitates modifying a document object model during runtime.

Memory management unit 500 can further include tagging component 540, as illustrated, which is configured to tag the integer representations included in the call stack. Here, it is noted that the tagging of integers is performed such that tagged integer representations are readily distinguishable from untagged pointer representations. To this end, it is further noted that tagging component 540 can be configured to tag integers in any of a plurality of ways. For instance, tagging component 540 can be configured to transform the integer representations into a different data structure. In a particular embodiment, such transformation can include having tagging component 540 configured to dedicate at least one bit in the different data structure to a tag.

In an aspect, memory management device 500 further includes tracing component 550. Within such embodiment, tracing component 550 is configured to trace the root objects identified by scanning component 530 to a corresponding set of memory locations. After an initial tracing of the root objects, it is contemplated that a subsequent tracing of related objects is performed. In a particular embodiment, however, the subsequent tracing is only performed on the untagged pointer representations and skipped on the tagged integer representations.

In a further aspect, memory management device 500 also includes recycling component 560, which is configured to free memory allocated to a set of objects unreachable by the call stack. In a particular embodiment, recycling component 560 can be configured to place objects called by the call stack onto a heap. Within such embodiment, recycling component 560 can then be further configured to initiate a garbage collection algorithm based on whether a size of the heap exceeds a threshold. In another embodiment, recycling component 560 can be configured to respectively preserve reachable objects in original storage locations of a heap. For example, recycling component 560 can be configured to maintain a separation of heap objects according to a fixed set of boundaries within the heap.

Figure 6:
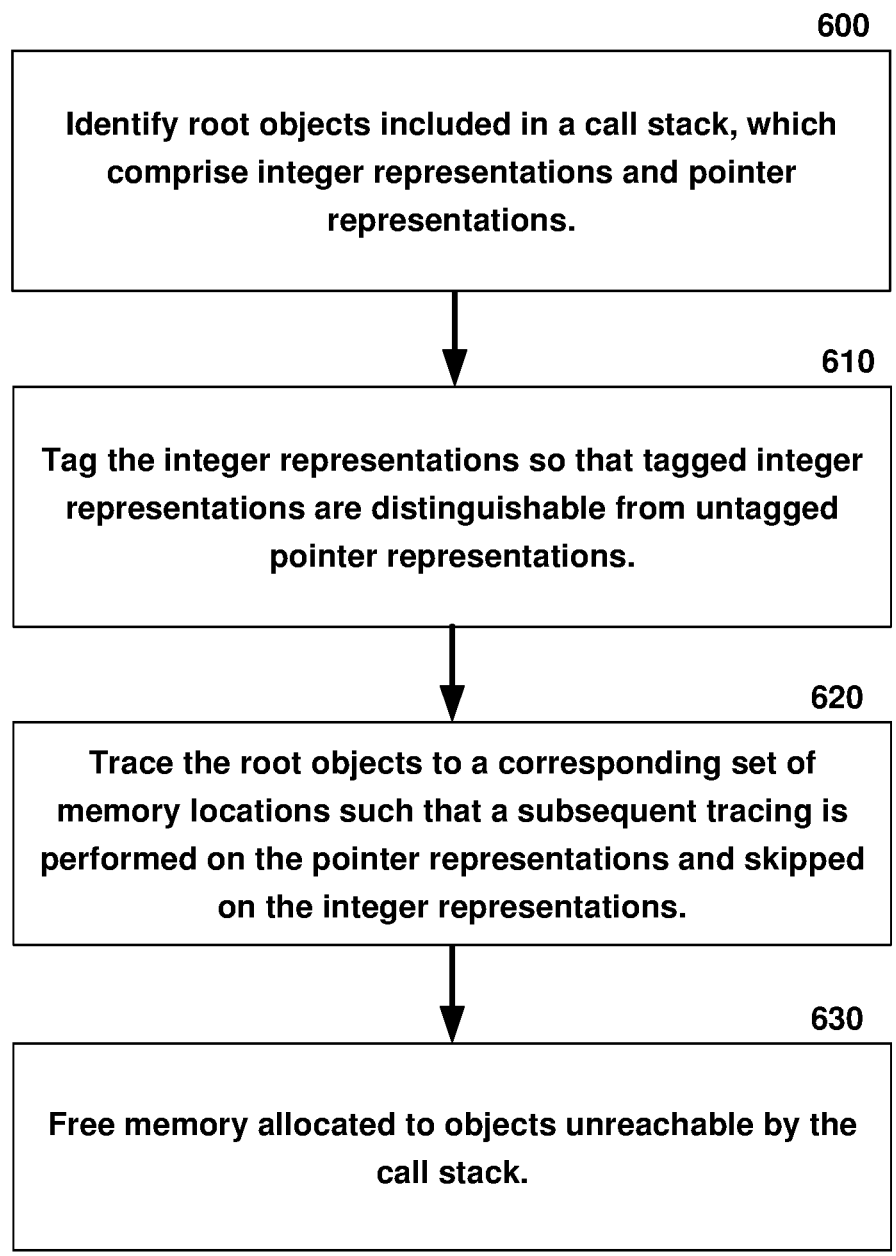
FIG. 6 is a flow diagram illustrating an exemplary non-limiting embodiment for implementing a conservative garbage collecting algorithm according to an embodiment.

FIG. 6 is a flow diagram illustrating an exemplary non-limiting embodiment for implementing a conservative garbage collecting algorithm according to an embodiment. At 600, root objects included in a call stack are identified, which comprise integer representations and pointer representations. Next, at 610, the integer representations are tagged so that tagged integer representations are distinguishable from untagged pointer representations. Root objects are then traced to a corresponding set of memory locations at 620 such that a subsequent tracing is performed on the pointer representations and skipped on the integer representations. Memory allocated to objects unreachable by the call stack is then freed at 630.

Figure 7:
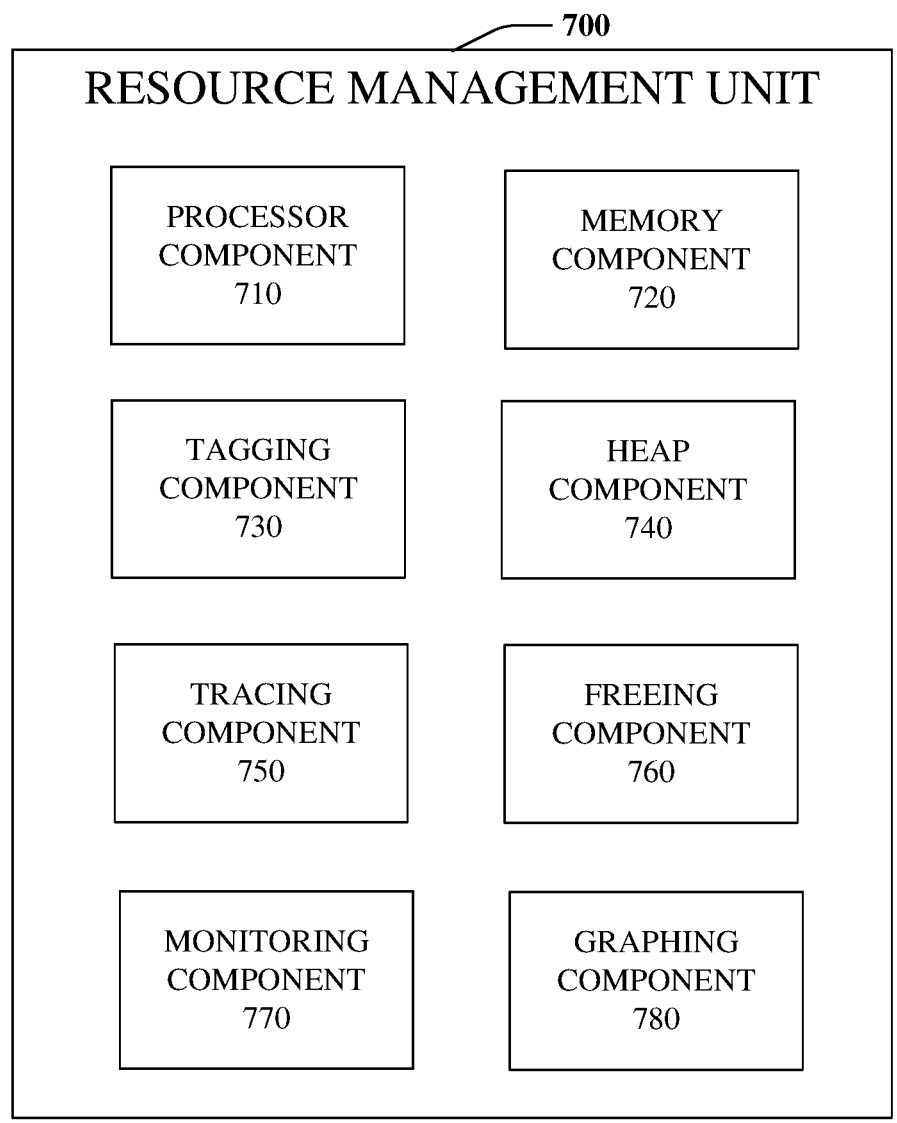
FIG. 7 is a block diagram illustrating an exemplary resource management unit according to an embodiment.

Referring next to FIG. 7, a block diagram illustrates an exemplary resource management unit configured to tag integers in accordance with various aspects. As illustrated, resource management unit 700 can include processor component 710, memory component 720, tagging component 730, heap component 740, tracing component 750, freeing component 760, monitoring component 770, and graphing component 780.

Similar to processor component 510 in memory management unit 500, processor component 710 is configured to execute computer-readable instructions related to performing any of a plurality of functions. Processor component 710 can be a single processor or a plurality of processors dedicated to analyzing information to be communicated from resource management unit 700 and/or generating information that can be utilized by memory component 720, tagging component 730, heap component 740, tracing component 750, freeing component 760, monitoring component 770, and/or graphing component 780. Additionally or alternatively, processor component 710 can be configured to control one or more components of resource management unit 700.

In another aspect, memory component 720 is coupled to processor component 710 and configured to store computer-readable instructions executed by processor component 710. Memory component 720 can also be configured to store any of a plurality of other types of data including data generated by any of tagging component 730, heap component 740, tracing component 750, freeing component 760, monitoring component 770, and/or graphing component 780. Here, it is noted that memory component 720 is analogous to memory component 520 in memory management unit 500. Accordingly, it can be appreciated that any of the aforementioned features/configurations of memory component 520 are also applicable to memory component 720.

As illustrated, resource management unit 700 can also include tagging component 730. Within such embodiment, tagging component 730 is configured to tag an object graph associated with a call stack. Here, it should be noted that root objects included in a tagged object graph can comprise tagged integer representations and untagged pointer representations. For some embodiments, it should be further noted that resource management unit 700 can also include graphing component 780, which is configured to produce object graphs tagged by tagging component 730.

In an aspect, resource management unit 700 is configured to manage objects included in a heap. To facilitate such management, resource management unit 700 can include heap component 740, which is configured to generate a heap of objects during an execution of the call stack. For this particular embodiment, it is contemplated that this heap of objects can comprise objects included in an executed portion of the call stack.

In another aspect, resource management unit 700 can further include tracing component 750. Within such embodiment, tracing component 750 is configured to trace unexecuted objects included in an unexecuted portion of the call stack to corresponding memory locations on the heap. Here, similar to tracing component 550 in memory management device 500, it is contemplated that tracing component 750 can be configured to perform a subsequent tracing of related objects after an initial tracing of the call stack's root objects. Moreover, it is contemplated that such subsequent tracing is only performed on the untagged pointer representations and skipped on the tagged integer representations.

As illustrated, resource management unit 700 can also include freeing component 760. Within such embodiment, freeing component 760 is configured to clear memory locations corresponding to objects on the heap which are deemed unreachable by the unexecuted portion of the call stack. In an aspect, freeing component 760 can be further configured to respectively preserve a storage of objects reachable by the unexecuted portion of the call stack in their original memory locations within the heap. In another aspect, resource management unit 700 can also include monitoring component 770, which is configured to monitor a size of the heap during execution of the call stack. For this particular embodiment, freeing component 760 can then be configured to trigger a clearing of memory allocated to unreachable objects based on the heap size exceeds a particular threshold.

Figure 8:
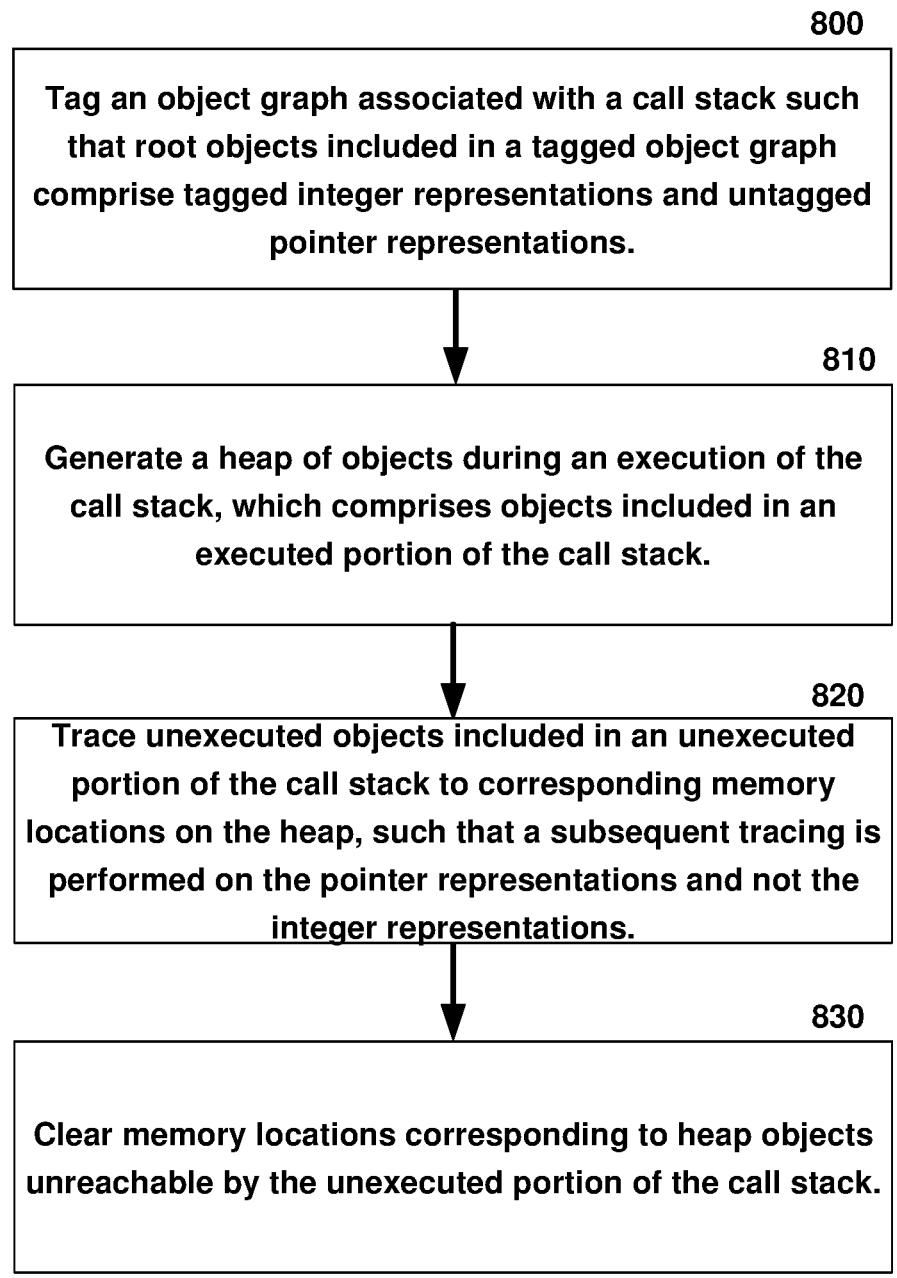
FIG. 8 is a flow diagram illustrating an exemplary non-limiting embodiment for tagging integers according to an embodiment.

FIG. 8 is a flow diagram illustrating an exemplary non-limiting embodiment for tagging integers according to an embodiment. At 800, an object graph associated with a call stack is tagged such that root objects included in a tagged object graph comprise tagged integer representations and untagged pointer representations. At 810, a heap of objects is then generated during an execution of the call stack, which comprises objects included in an executed portion of the call stack. Next, at 820, unexecuted objects included in an unexecuted portion of the call stack are traced to corresponding memory locations on the heap. For this particular embodiment, a subsequent tracing is only performed on the pointer representations and not the integer representations. Memory locations corresponding to heap objects unreachable by the unexecuted portion of the call stack are then cleared at 830.

Exemplary Networked and Distributed Environments

One of ordinary skill in the art can appreciate that the various embodiments for tagging integers within a conservative garbage collecting algorithm described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Figure 9:
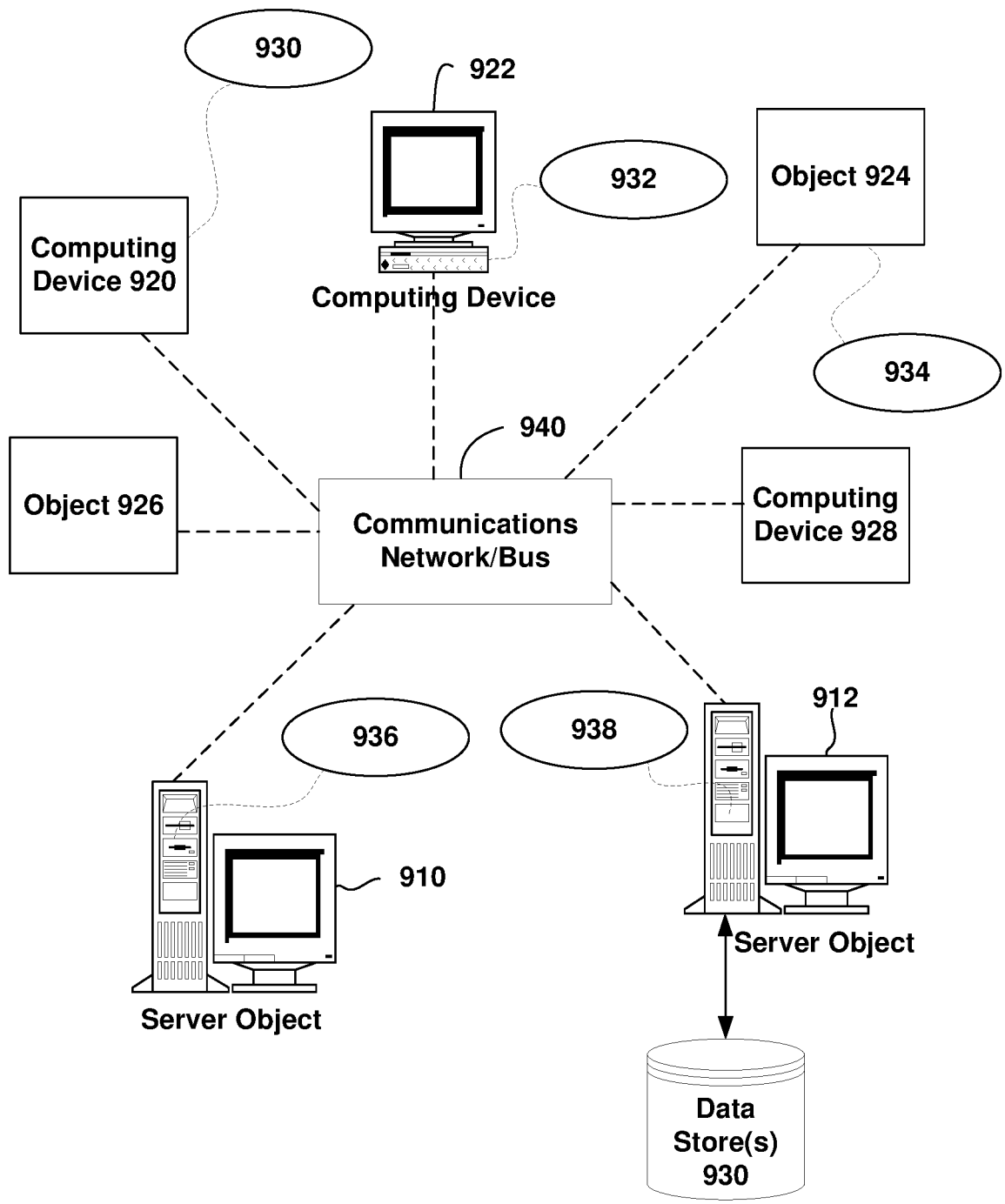
FIG. 9 is a block diagram representing exemplary non-limiting networked environments in which various embodiments described herein can be implemented.

FIG. 9 provides a non-limiting schematic diagram of an exemplary networked or distributed computing environment. The distributed computing environment comprises computing objects or devices 910, 912, etc. and computing objects or devices 920, 922, 924, 926, 928, etc., which may include programs, methods, data stores, programmable logic, etc., as represented by applications 930, 932, 934, 936, 938. It can be appreciated that computing objects or devices 910, 912, etc. and computing objects or devices 920, 922, 924, 926, 928, etc. may comprise different devices, such as PDAs, audio/video devices, mobile phones, MP3 players, laptops, etc.

Each computing object or device 910, 912, etc. and computing objects or devices 920, 922, 924, 926, 928, etc.

can communicate with one or more other computing objects or devices 910, 912, etc. and computing objects or devices 920, 922, 924, 926, 928, etc. by way of the communications network 940, either directly or indirectly. Even though illustrated as a single element in FIG. 9, network 940 may comprise other computing objects and computing devices that provide services to the system of FIG. 9, and/or may represent multiple interconnected networks, which are not shown. Each computing object or device 910, 912, etc. or 920, 922, 924, 926, 928, etc. can also contain an application, such as applications 930, 932, 934, 936, 938, that might make use of an API, or other object, software, firmware and/or hardware, suitable for communication with or implementation of an infrastructure for information as a service from any platform as provided in accordance with various embodiments.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the techniques as described in various embodiments.

Thus, a host of network topologies and network infrastructures, such as client/server, peer-to-peer, or hybrid architectures, can be utilized. In a client/server architecture, particularly a networked system, a client is usually a computer that accesses shared network resources provided by another computer, e.g., a server. In the illustration of FIG. 9, as a non-limiting example, computing objects or devices 920, 922, 924, 926, 928, etc. can be thought of as clients and computing objects or devices 910, 912, etc. can be thought of as servers where computing objects or devices 910, 912, etc. provide data services, such as receiving data from computing objects or devices 920, 922, 924, 926, 928, etc., storing of data, processing of data, transmitting data to computing objects or devices 920, 922, 924, 926, 928, etc., although any computer can be considered a client, a server, or both, depending on the circumstances. Any of these computing devices may be processing data, or requesting services or tasks that may implicate memory management and related techniques as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the user profiling can be provided standalone, or distributed across multiple computing devices or objects.

In a network environment in which the communications network/bus 940 is the Internet, for example, the computing objects or devices 910, 912, etc. can be Web servers with which the computing objects or devices 920, 922, 924, 926, 928, etc. communicate via any of a number of known protocols, such as HTTP. As mentioned, computing objects or devices 910, 912, etc. may also serve as computing objects or devices 920, 922, 924, 926, 928, etc., or vice versa, as may be characteristic of a distributed computing environment.

Exemplary Computing Device

As mentioned, various embodiments described herein apply to any device wherein it may be desirable to implement an infrastructure for tagging integers within a conservative garbage collecting algorithm. It is understood, therefore, that handheld, portable and other computing devices and computing objects of all kinds are contemplated for use in connection with the various embodiments described herein, i.e., anywhere that a device may provide some functionality in connection with implementing a conservative garbage collecting algorithm with tagged integers. Accordingly, the below general purpose remote computer described below in FIG. 10 is but one example, and the embodiments of the subject disclosure may be implemented with any client having network/bus interoperability and interaction.

Although not required, any of the embodiments can partly be implemented via an operating system, for use by a developer of services for a device or object, and/or included within application software that operates in connection with the operable component(s). Software may be described in the general context of computer-executable instructions, such as program modules, being executed by one or more computers, such as client workstations, servers or other devices. Those skilled in the art will appreciate that network interactions may be practiced with a variety of computer system configurations and protocols.

Figure 10:
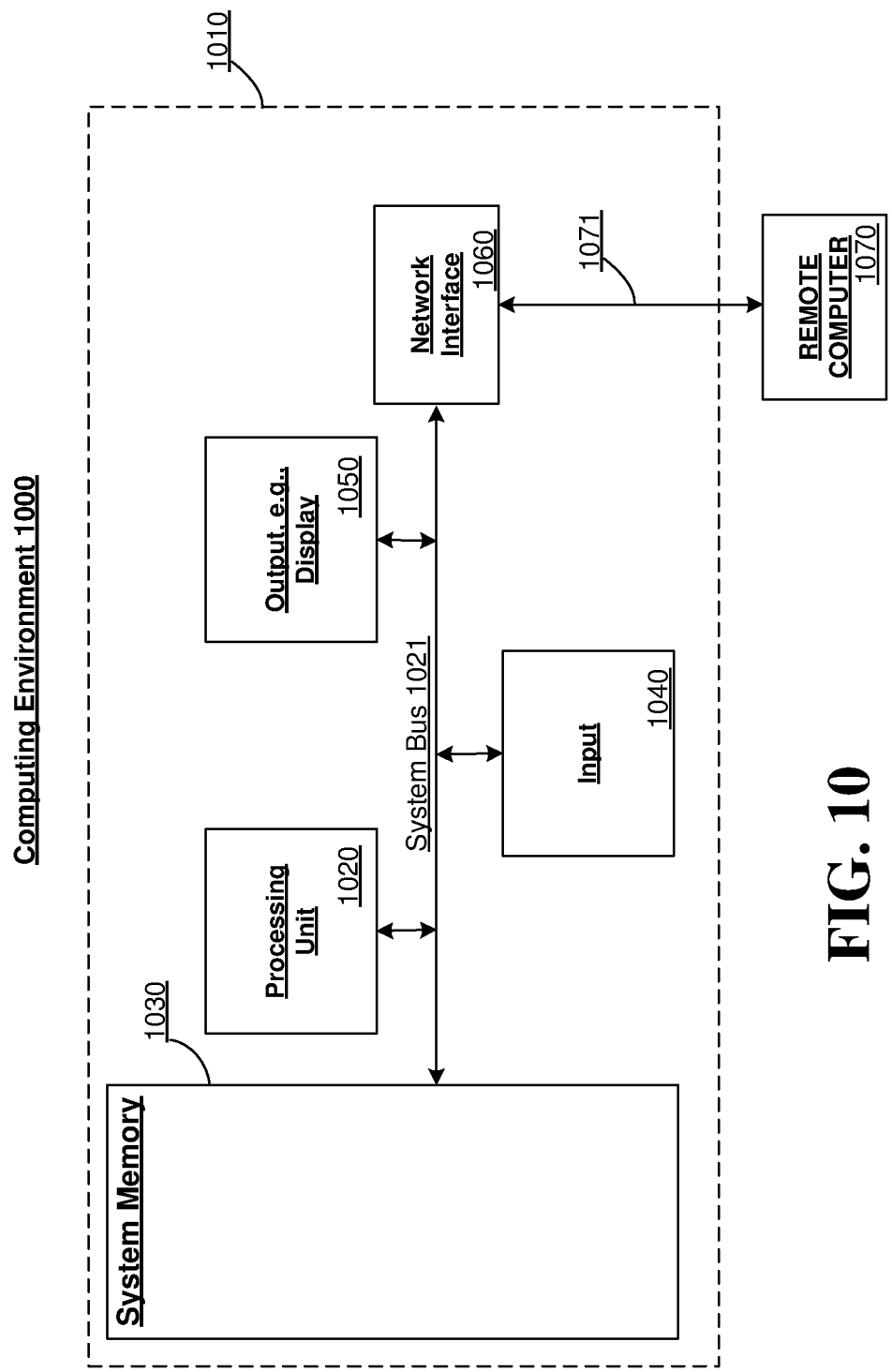
FIG. 10 is a block diagram representing an exemplary non-limiting computing system or operating environment in which one or more aspects of various embodiments described herein can be implemented.

FIG. 10 thus illustrates an example of a suitable computing system environment 1000 in which one or more of the embodiments may be implemented, although as made clear above, the computing system environment 1000 is only one example of a suitable computing environment and is not intended to suggest any limitation as to the scope of use or functionality of any of the embodiments. The computing environment 1000 is not to be interpreted as having any dependency or requirement relating to any one or combination of components illustrated in the exemplary operating environment 1000.

With reference to FIG. 10, an exemplary remote device for implementing one or more embodiments herein can include a general purpose computing device in the form of a handheld computer 1010. Components of handheld computer 1010 may include, but are not limited to, a processing unit 1020, a system memory 1030, and a system bus 1021 that couples various system components including the system memory to the processing unit 1020.

Computer 1010 typically includes a variety of computer readable media and can be any available media that can be accessed by computer 1010. The system memory 1030 may include computer storage media in the form of volatile and/or nonvolatile memory such as read only memory (ROM) and/or random access memory (RAM). By way of example, and not limitation, memory 1030 may also include an operating system, application programs, other program modules, and program data. Software can be embodied on a digital versatile disk (DVD), compact disk (CD), or other removable storage as well.

A user may enter commands and information into the computer 1010 through input devices 1040 A monitor or other type of display device is also connected to the system bus 1021 via an interface, such as output interface 1050. In addition to a monitor, computers may also include other peripheral output devices such as speakers and a printer, which may be connected through output interface 1050.

The computer 1010 may operate in a networked or distributed environment using logical connections to one or more other remote computers, such as remote computer 1070. The remote computer 1070 may be a personal computer, a server, a router, a network PC, a peer device or other common network node, or any other remote media consumption or transmission device, and may include any or all of the elements described above relative to the computer 1010. The logical connections depicted in FIG. 10 include a network 1071, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices, networks and advertising architectures, the underlying concepts may be applied to any network system and any computing device or system in which it is desirable to manage memory.

There are multiple ways of implementing one or more of the embodiments described herein, e.g., an appropriate API, tool kit, driver code, operating system, control, standalone or downloadable software object, etc. which enables applications and services to use the memory management. Embodiments may be contemplated from the standpoint of an API (or other software object), as well as from a software or hardware object that facilitates provision of memory management in accordance with one or more of the described embodiments. Various implementations and embodiments described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter can be appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

While in some embodiments, a client side perspective is illustrated, it is to be understood for the avoidance of doubt that a corresponding server perspective exists, or vice versa. Similarly, where a method is practiced, a corresponding device can be provided having storage and at least one processor configured to practice that method via one or more components.

While the various embodiments have been described in connection with the preferred embodiments of the various figures, it is to be understood that other similar embodiments may be used or modifications and additions may be made to the described embodiment for performing the same function without deviating there from. Still further, one or more aspects of the above described embodiments may be implemented in or across a plurality of processing chips or devices, and storage may similarly be affected across a plurality of devices. Therefore, the present invention should not be limited to any single embodiment, but rather should be construed in breadth and scope in accordance with the appended claims.

What is claimed is:

1. A method, comprising:
    tagging integer representations in an object graph associated with a call stack, the call stack including one or more root objects, the object graph including at least one root object associated with a tagged integer representation and at least one root object associated with an untagged pointer representation;
    generating a heap of objects during an execution of the call stack, the heap of objects including root objects in an executed portion of the call stack;
    performing a first trace on unexecuted root objects included in an unexecuted portion of the call stack to corresponding memory locations on the heap;
    performing a subsequent trace on memory locations associated with the untagged pointer representations identified by the object graph, while skipping the subsequent trace on the tagged integer representations identified by the object graph; and clearing memory locations corresponding to objects on the heap unreachable by one or more root objects in the unexecuted portion of the call stack.

2. The method of claim 1, further comprising:
monitoring a size of the heap during the execution of the call stack, and wherein the clearing of memory locations corresponding to objects is triggered by the size of the heap exceeding a threshold.

3. The method of claim 1, wherein clearing memory locations corresponding to objects, further comprises:
preserving a storage of reachable objects in original memory locations of the heap, the reachable objects are reachable by the unexecuted portion of the call stack.

4. The method of claim 1, wherein the call stack is associated with a compilation of a script.

5. The method of claim 1, wherein the call stack is associated with a modification of an object model.

6. The method of claim 1, wherein tagging integer representations in an object graph associated with a call stack further comprises:
transforming the integer representations into a data structure that differs from the pointer representations.

7. The method of claim 6, wherein at least one bit of the different data structure represents a tag.

8. A method, comprising:
executing script code that allocates memory for a plurality of objects, the plurality of objects including at least one of an integer value and a pointer value;
during execution of the script code, tagging the at least one integer value in a tagged object graph;
determining which objects of the plurality of objects are unreachable by an unexecuted call stack by identifying the unreachable objects as not being included in the tagged object graph; and
clearing memory locations corresponding to the unreachable objects.

9. The method of claim 8, wherein the script code includes Javascript code that is executed against a document object model.

10. The method of claim 8, further comprising:
using the tagged object graph to determine which objects in the unexecuted call stack are reachable by tracing root objects in the unexecuted call stack to corresponding memory locations.

11. The method of claim 10, further comprising:
skipping a subsequent trace on a reachable tagged integer value and performing the subsequent trace on reachable untagged pointer values.

12. The method of claim 10, further comprising:
tracing one or more untagged root pointer values to identity a reachable object and only performing a subsequent trace on a reachable untagged pointer value.

13. The method of claim 8, wherein execution of the script code further comprises:
executing a call stack; and
generating the memory for the plurality of objects in a heap.

14. The method of claim 13, further comprising:
tracing objects in an unexecuted portion of the call stack to locations in the heap and only performing a subsequent trace on reachable pointer values.

15. A method, comprising:
tagging integer representations in an object graph associated with a call stack, the object graph including at least one root object associated with a tagged integer representation and at least one root object associated with a pointer representation;
generating a heap of objects during an execution of the call stack, the heap of objects including one or more objects associated with the call stack;
determining whether a monitored size of the heap exceeds a threshold;
based on the determination, performing a first trace on objects reachable by an unexecuted portion of the call stack;
performing a second trace on objects that are not associated with the tagged integer representations; and
reclaiming memory locations corresponding to one or more objects unreachable by the unexecuted portion of the call stack.

16. A method, comprising:
determining whether a monitored size of a heap exceeds a threshold, wherein the heap comprises a first set of integer objects and a second set of pointer objects, and wherein one or more objects in the first set of objects are associated with a tagged integer representation;
based on the determination, performing a first trace on objects reachable by an unexecuted portion of the call stack;
performing a second trace, wherein the second trace does not include the one or more objects in the first set associated with a tagged integer representation; and
reclaiming memory locations corresponding to one or more unreachable objects.

17. The method of claim 16 further comprising tagging the one or more objects in the first set and transforming integer representations of the one or more objects in the first set into a first data structure.

18. The method of claim 17, wherein the first data structure comprises at least one bit dedicated to a tag.

* * * * *